Dec. 10, 1957

A. B. BASSOFF 2,815,579

GEAR GAUGING MASTER

Filed Jan. 17, 1955

INVENTOR.
ARTHUR B. BASSOFF
BY Whittemore,
Hulbert & Belknap.
ATTORNEYS

United States Patent Office 2,815,579
Patented Dec. 10, 1957

2,815,579

GEAR GAUGING MASTER

Arthur B. Bassoff, Detroit, Mich., assignor to National Broach & Machine Company, Detroit, Mich., a corporation of Michigan Application January 17, 1955, Serial No. 482,207

1 Claim. (Cl. 33—179.5)

The present invention relates to gear gauging apparatus, and more particularly to automatic means for checking gears capable of determining incompletely roughed out gears as for example, gears either hobbed or shaper cut in which the operation was not finished completely. In the case of shaper cut gears the deficiency may result from an operation in which the work gear was not rotated through a full turn of 360 degrees after the shaper cut had been fed to depth, which will result in one or more teeth which are thicker than normal. In the case of hobbed gears incompletely roughed out gears may result from an operation in which feed was terminated before the hobbing cutter had cut completely through the end blank, which will leave all teeth on the gear blank abnormally thick at one end thereof. Another deficiency determined by the present checking apparatus is a gear blank having a single thin tooth, which may result from a shaper cutting operation in which the rotation of the gear is continued slightly beyond 360 degrees so as to perform a second cutting operation on only one tooth of the gear.

With the foregoing general remarks in mind it is an object of the present invention to provide automatic gear checking means for locating incompletely hobbed gears.

It is a further object of the present invention to provide gear checking means including means for locating undersize and oversize gears, and as an additional function, to determine incompletely hobbed or shaper cut gears.

It is a feature of the present invention to provide gear checking apparatus comprising means for rotating a work gear in mesh with a master gear so as to determine variations in size of work gears, eccentricity and the like.

It is a feature of the present invention to provide gear checking apparatus comprising a master gear conjugate to a gear to be checked and characterized in that at least every other tooth of the master gear is omitted to prevent bridging so as to permit determination of a gear having a single abnormally thin tooth.

Other objects and features of the invention will become apparent as the description proceeds, especially when taken in conjunction with the accompanying drawings, wherein.

Figure 1:
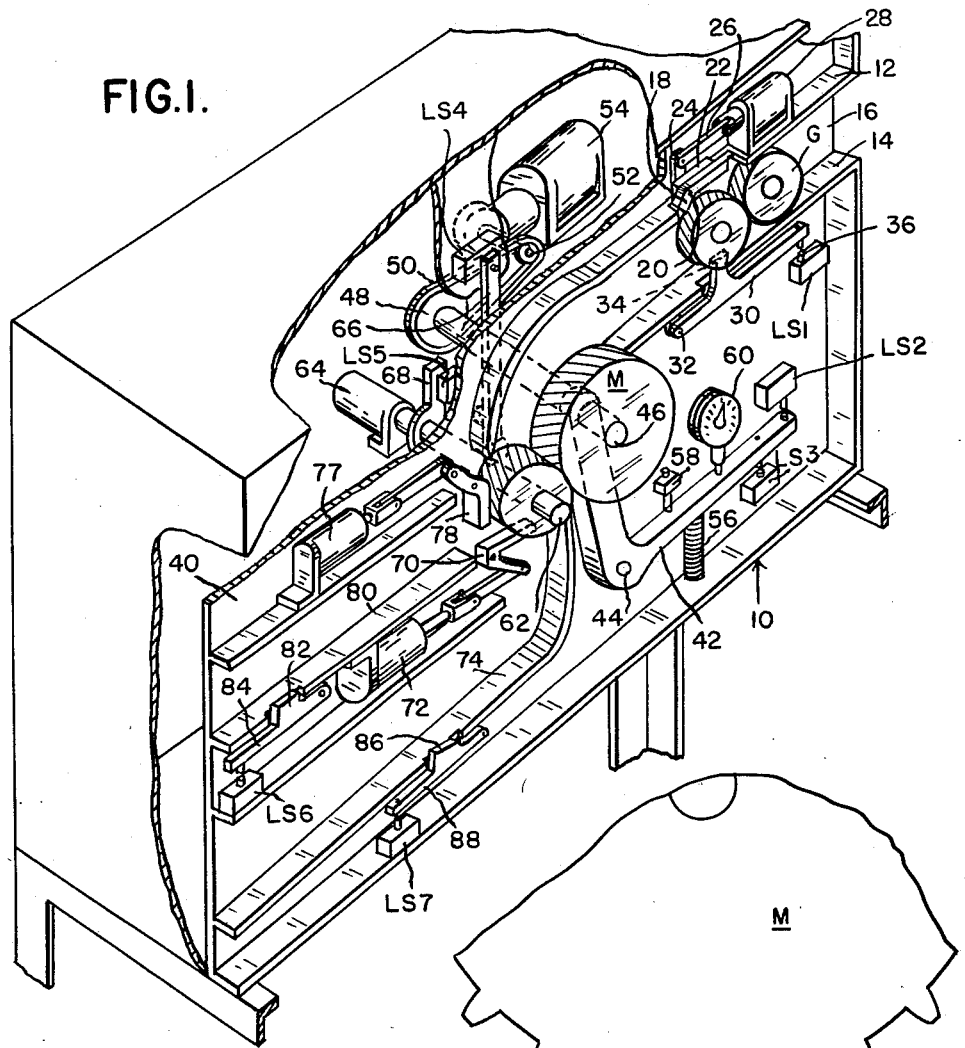
Figure 1 is a more or less diagrammatic perspective view with parts broken away of the improved gear checking apparatus.

Referring now to Figure 1 the gear checking apparatus comprises a frame 10 having strips 12 and 14 supported to provide a passageway or loading chute 16 adapted to receive a plurality of work gears indicated at G. It will be appreciated that the chute may be extended and the portion illustrated in the figure may be only the forward end of such chute. Gears are retained in the position illustrated by a detent 18 pivotally mounted as indicated at 20 to a bracket 22. The detent is operated by an arm 24 connected by a link 26 to a solenoid 28. When the solenoid 28 is energized the link 26 moves to the left rocking the detent clockwise and releasing the foremost gear G while blocking the second gear from forward movement. When the solenoid is de-energized it is returned to the illustrated position by a spring and the second gear in line moves by gravity into engagement with the detent.

Presence of a gear engagement with the detent is sensed by a lever 30 pivoted as indicated at 32 and having an upwardly extending portion 34 engageable with the foremost gear. When a gear is in position against the detent the lever 30 is depressed into engagement with the contact 36 of a limit switch LS1 which conditions the control circuit for automatic operation.

Pivoted to a supporting panel 40 is a bell crank 42, the pivot connection being illustrated at 44. The bell crank carries a shaft 46 to which is secured the master gear M. The shaft 46 extends through an enlarged opening (not shown) in the panel 40 and at its inner end carries a sheave 48 connected by a belt or chain 50 to a sheave or chain driving element 52 driven in constant rotation by a motor indicated generally at 54. The bell crank 42 is engaged by a spring 56 biasing the bell crank in a counterclockwise direction, movement being limited by an adjustable stop 58 carried by the panel. The panel also carries a dial gauge 60 for adjusting the bell crank in proper position. Also carried by the panel 40 are limit switches LS2 and LS3, the former being actuated when an undersize gear is in mesh with the master gear, and the latter being actuated when an oversize gear is in contact with the master gear. When a work gear is released by the detent 18 it rolls down the loading chute into engagement with the constantly rotating master gear M which master gear rotates in a counterclockwise direction. The gear to be checked is thus carried around the periphery of the master gear until it reaches a position in substantial alignment with a movable arbor 62 which is connected to a fluid cylinder device indicated at 64. Movement of the gear into the aforesaid position actuates an arm 66 which in turn trips a limit switch LS4 which admits fluid to the cylinder 64 and advances the arbor through the hole in the gear. The gear is thus supported in accurately predetermined position in mesh with the constantly rotating master gear M. Movement of the arbor 62 into its forward position results in tripping a limit switch LS5 by an arm 68 carried by the arbor. Actuation of limit switch LS5 initiates a timing circuit to start the actual gauging of the work on the arbor. If the gear being gauged is of proper size and is completely hobbed and has neither a thick nor a thin tooth, the bell crank 42 is maintained in a position intermediate the contacts of limit switches LS2 and LS3 and the gear is acceptable for further processing, as for example shaving in a gear shaving machine. If however, the gear is oversize or if the gear gives an indication of oversize due to incomplete hobbing or due to a single thick tooth, the bell crank 42 is rocked clockwise to a position in which it trips limit switch LS3.

If the gear is undersize or if it includes a thin tooth, the bell crank 42 is rocked counterclockwise to a position in which it trips limit switch LS2.

If either limit switch LS2 or LS3 is tripped, then after the work has completed at least two full revolutions the arbor 62 is retracted and a movable gate 70 is tripped by solenoid 72 permitting the gear to roll down a curved rail 74 defining the chute for rejected gears. If neither of the limit switches LS2 or LS3 is tripped, during rotation of the work gear G, after the full rotation of the work gear the arbor 62 is retracted and the solenoid 77 is energized, opening gate 78, which permits the gear to roll down a rail 80 which defines the discharge chute for good or acceptable gears.

Movement of a good gear along the rail 80 actuates a projection 82 on a lever 84 which trips a limit switch LS6. Movement of a rejected gear along the rail 74 trips a projection 86 on a lever 88 and trips limit switch LS7. Actuation of either limit switch LS6 or LS7 indicates passage of the gauged gear from the apparatus and signals the detent to release another gear from the loading chute.

If the loading chute is empty when the gear passes out of the machine, the detent will not be tripped until the chute is reloaded and a new work gear is engaged with the detent and closes limit switch LS1.

Figure 2:
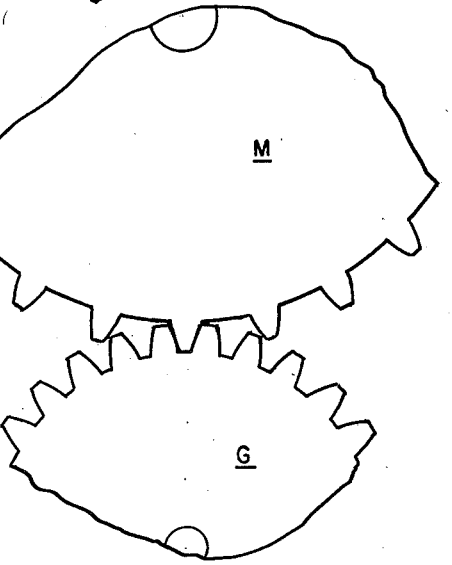
Figure 2 is a diagrammatic view showing the relationship between a gear to be checked and the master gear having alternate teeth omitted.

Referring now to Figure 2 the relationship between the master gear M and a work gear G is illustrated. Inasmuch as the master gear in an ordinary case has every other tooth T omitted, its teeth will engage only in every other tooth space of the gear G being gauged. During rolling motion of the master gear and gear in mesh, each tooth of the master gear will at one time be the only tooth in mesh with the gear. Thus, if it is engaged with a relatively wide tooth space (which will be the case if the work gear has a single thin tooth) the master gear may move radially toward the gear being gauged, thus giving an indication of the thin tooth condition. It will be appreciated that if every tooth of the master gear were present, in the usual case the relatively wide tooth space resulting from the presence of a thin tooth would be bridged by two or more teeth in contact at opposite sides thereof, thus preventing radial movement between the master gear and the gear being gauged.

A certain amount of variation in operating results may be obtained by employing teeth of the master gear having relatively increased or decreased addendums since this will result in a longer arc of action. In other words, if removal of every other tooth in the master gear fails to bring about a condition in which only a single tooth of the master gear is in contact with teeth of proper size of the work gear for an interval sufficient to actuate the sensitive gauging mechanism, a reduction in addendum of the teeth of the master gear may be sufficient to reduce the arc of contact and so bring about the condition which renders the master gear sensitive to a single thin tooth condition on the work gear.

It will be apparent from the foregoing that the apparatus illustrated is effective to determine not only oversize and undersize gears, but also completely and irregularly hobbed or shaped gear blanks such for example as gears having teeth which are thicker at one end than the other, gears having a single relatively thick tooth, and gears having a single relatively thin tooth resulting in one or more relatively wide tooth spaces.

The apparatus is designed to automatically detect gears which are unacceptable for any one or more of the above identified reasons and to reject such gears. Gears which exhibit none of the aforesaid deficiencies are passed automatically through the machine.

As a result, the present gear gauging apparatus finds its most important field of utility in an automatic gear production line disposed between a gear roughing machine and a gear shaving machine. The gauging apparatus will automatically reject all gears which might cause damage to the gear shaving machine and will pass to the gear shaving machine only such gears as will not injure the machine and which may be suitably finished by a shaving operation. It will be appreciated that undersize gears are rejected, not because they would injure the machine, but because the shaving operation would not make them acceptable.

The drawings and the foregoing specification constitute a description of the improved gear gauging apparatus in such full, clear, concise and exact terms as to enable any person skilled in the art to practice the invention, the scope of which is indicated by the appended claim.

What I claim as my invention is:

A master gear designed to be run in mesh with a gear to be checked to sense the presence of a single tooth of less than required tooth thickness, said master gear having a series of uniformly circumferentially spaced teeth conjugate to the teeth of the gear to be checked, the circumferential spacing of such teeth being a whole multiple greater than one of the circumferential spacing of the teeth on the gear to be checked and such as to provide carry-over between successive teeth.

References Cited in the file of this patent

UNITED STATES PATENTS

| | | |
|---|---|---|
| 265,595 | Gilliand | Oct. 10, 1882 |
| 1,098,912 | Law | June 2, 1914 |
| 1,445,631 | Lotz | Feb. 20, 1923 |
| 1,663,085 | Logue | Mar. 20, 1928 |
| 2,540,961 | Osplack | Feb. 6, 1951 |
| 2,689,410 | Beam | Sept. 21, 1954 |
| 2,726,455 | Saari | Dec. 13, 1955 |

FOREIGN PATENTS

| | | |
|---|---|---|
| 605,041 | Germany | Nov. 2, 1934 |